United States Patent [19]

Pittman

[11] 4,360,217
[45] Nov. 23, 1982

[54] VEHICLE COUPLING DEVICE

[76] Inventor: Jerry W. Pittman, P.O. Box 2111, Denton, Tex. 76201

[21] Appl. No.: 189,138

[22] Filed: Sep. 22, 1980

[51] Int. Cl.³ .............................................. B60D 1/06
[52] U.S. Cl. .................................................. 280/513
[58] Field of Search ....................... 280/513, 511, 512

[56] References Cited

U.S. PATENT DOCUMENTS 2,523,500  7/1950  Davey et al. ........................ 280/513
3,794,356  2/1974  Hollis, Jr. ............................ 280/513

Primary Examiner—Joseph F. Peters, Jr.
Assistant Examiner—Donn McGiehan

[57] ABSTRACT

A coupling device for use on a towed vehicle, comprises: a body for receiving a ball of a ball-type hitch and a latch assembly for locking the ball in the front position of the body. The latch assembly may include a bracket connected to side portions of the body and a locking element supported by the bracket for movement between opened and closed positions. The locking element has a body with a bearing surface to engage the ball when in the locked position and a surface cooperating with a surface on the bracket. The cooperating surfaces are disposed at an angle relative to a line extending transversely to a lateral line bisecting the body. This angle is sufficient to permit lateral movement of the bearing surface away from the ball to disconnect the coupling device from the ball while being less than that angle which would cause the locking element to move toward the opened position when the ball re-engages the locking element in the negative loan condition. The coupling device may include a ball socket having a hemispherical surface to engage the ball, the hemispherical surface having an axis of symmetry disposed in a plane that bisects the coupling device body with the upper portion of the axis extending at an angle of approximately 20° relative to an axis of symmetry extending through the ball toward the front portion of the coupling device body.

16 Claims, 10 Drawing Figures

VEHICLE COUPLING DEVICE

The use of coupling devices to allow a car or truck to tow other vehicles, such as a car, a truck, house trailer, boat trailers, and cattle trailers, are well known. Some examples of these coupling devices are given in U.S. Pat. Nos. 195,025; 2,231,025; 2,347,033; 2,520,039; 3,180,667; 3,493,024; 3,567,253; 3,794,356; 3,831,982; 3,880,450; 3,888,517; 3,939,347; 4,133,533; and 4,157,910.

Typically these prior art vehicle coupling devices have a body attached to the towed vehicle to receive the ball of a ball type hitch which is attached to the towing vehicle. A latching assembly is provided on the body to prevent disengagement of the ball when the towed vehicle is being moved. Each of these prior art coupling devices has a direct relationship between the latch assembly and the size of ball so as to prevent disengagement. However, no prior art device has been developed that uses a universal type latching assembly which may be incorporated in any number of different sized bodies to permit easy construction of different coupling devices for different sized balls. Further, no prior art device has been developed that uses a coupling device having a latching assembly for locking the ball of a ball type hitch within the coupling device which is self-locking. Further, no prior art device has been developed that uses a ball socket disposed within the body to inhibit the likelihood of disengagement between the coupling device and the ball of a ball-type hitch.

Accordingly, it is an object of the present invention to provide a coupling device for use on a towed vehicle that has a latching assembly which may be used with a number of different coupling bodies for use with different sized balls.

Further, it is an object of the present invention to provide a coupling device adapted to be used on a towed vehicle which includes a latching assembly having a locking element that inhibits disengagement with a ball so as to inhibit the likelihood of damage to the towed vehicle.

Further, it is an object of the present invention to provide a coupling device including a body latching assembly and a ball socket connected to the body and disposed to aid in retaining the ball connection.

In accordance with the invention, a coupling device adapted to be used on a towed vehicle, comprises; a strap-like body having a U-shaped front portion for receiving a ball of a ball-type hitch, a side portion extending from each end of the U-shaped portion adapted to be connected to the towed vehicle. A latch assembly for locking the ball in the body has a bracket connected to each side portions of the body, and a locking element supported by the bracket for movement between opened and closed positions, the movement being in a direction generally transverse to a lateral line which bisects the U-shape portion. The locking element has a body with a bearing surface to engage the ball when in the closed position and with a surface movably cooperating with a surface on the bracket. The cooperating surfaces are disposed at an angle relative to a line extending transversely to the lateral line with the angle being sufficient to allow the bearing surface to move away from the ball when the coupling device is in a negative load condition while being less than that angle which causes the locking element to move toward the closed position when the ball re-engages the locking element from the negative load condition.

Further, in accordance with the invention, a coupling device for use on a towed vehicle, comprises, a body having front and rear portions and a plane bisecting a U-shaped portion, the plane extending through the front and rear portions. A latching assembly is provided on the body for locking a ball of a ball-type hitch in the body. A ball socket for receiving the ball is connected to the body and includes a ball socket element or body with a hemispherical surface to engage the ball. The hemispherical surface has an axis of symmetry disposed in the plane of the coupling device. The axis of symmetry of the hemispherical surface has an upper portion extending at an angle of approximately 20° relative to an axis of symmetry extending through the ball toward the front portion of the coupling device body.

Other objects and advantages of the invention will become apparent upon reading the following detailed description and upon reference to the drawings, in which like reference characters are used throughout the drawings to designate like parts;

Figure 1:
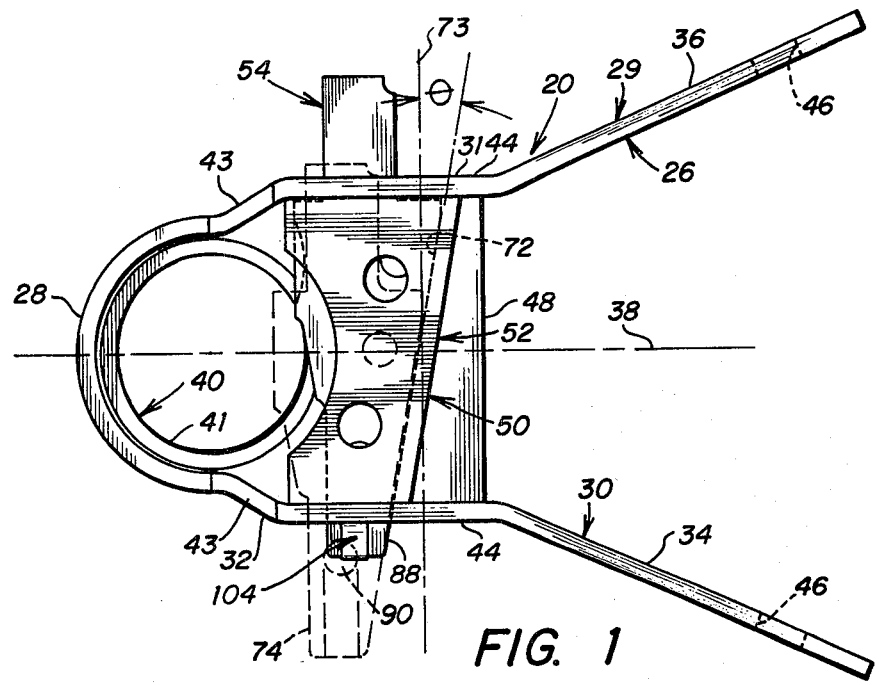
FIG. 1 is a bottom plan view of a coupling device constructed according to the present invention.
Figure 2:
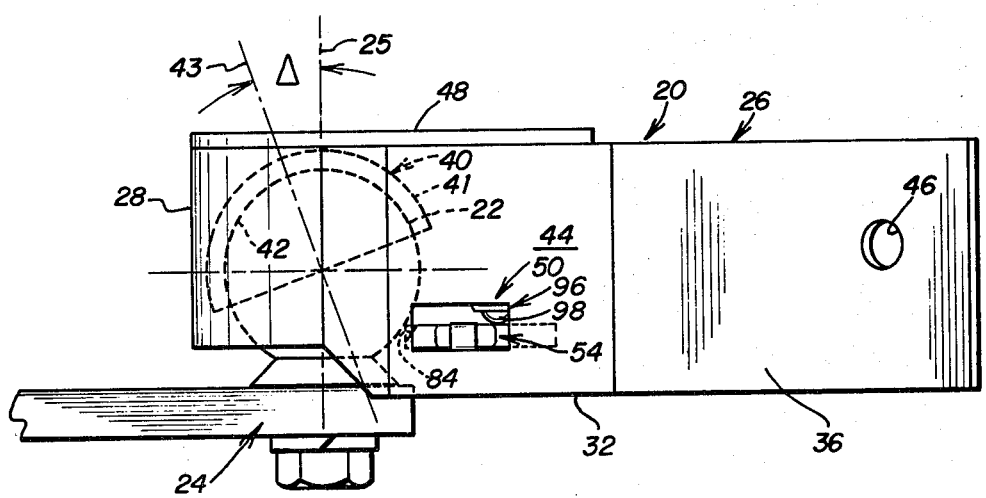
FIG. 2 is a side elevational view of the invention shown in FIG. 1, illustrating the relationship between the coupling device and a ball on a ball-type hitch.

Turning now to the drawings, there is shown in FIGS. 1 and 2 a coupling device 20 for use on a towed vehicle (not shown) and is shown as being connected to a ball 22 of a ball-type hitch 24 which is attached to a towing vehicle (not shown). Ball 22 and hitch 24 are of conventional design and ball 22, typically, includes an axis of symmetry 25 extending upwardly through the ball.

Coupling device 20 includes a strap-like body 26 having a U-shaped portion 28 in the front of the device and side portions 29 and 30 which extend from each end of the U-shaped portion and adapted to be connected to the towed vehicles. Side portions 29 and 30 include intermediate portions 31 and 32 and leg portions 34 and 36 disposed on each end of intermediate portions 31 and 32, respectively. Preferably, body 26 is disposed about a lateral plane 38 (forming a line in FIG. 1) drawn to bisect the U-shaped portion 28. U-shaped portion 28 supports a ball socket 40 which receives ball 22 therein. Ball socket 40 has a body 41 with a hemispherical surface 42 to engage ball 22. Accordingly, since balls 22 are typically 1 ⅞, 2 and 2 5/16 inches in diameter, hemispherical body 41 and surface 42 are different for each sized ball 22 to provide maximum engagement and thereby inhibit movement therebetween. However, each ball socket body 41 is connected, as by welding, to U-shaped portion 28 of coupling device body 26 by positioning the upper portion of hemispherical surface axis of symmetry 43 at an angle Delta of approximately 20° relative to ball axis of symmetry 25 and pointing toward the front of U-shaped portion 28, the ball axis of symmetry 25 being disposed to be in plane 38. Although surface 42 is described as hemispherical, it is to be understood that this surface may be slightly less than a hemisphere.

Each intermediate portion 31 and 32 includes a first section 43 extending from the ends of U-shaped portion 28 and a second section 44 disposed to extend substantially parallel to lateral plane 38. Although the diameter of each ball 22 may vary thereby increasing or decreasing the taper of sections 43 relative to plane 38, second sections 44 of intermediate portions 31 and 32 remain substantially equidistant from one another to permit one latching assembly to be used for the different sized balls 22.

Leg portions 34 and 36 may be tapered outwardly, as shown in FIG. 1, or parallel depending upon the tow bar to which device 20 is being attached. Further, each leg portion 34 and 36 includes a hole 46 through which a bolt may be inserted for connecting to the tow bar arrangement (not shown).

A top cover 48 may be provided across the upper surface of strap-like body 26 to prevent foreign matter from falling into the interior of the coupling device.

A latch assembly 50 is provided to lock ball 22 in body 26. Latch assembly 50 includes a bracket 52, best seen in FIGS. 3-5, connected to second sections 44 of each side 31 and 32 of body 26 and a locking element 54, as shown in FIGS. 6-8, supported by bracket 52 for movement in a direction generally transverse to lateral plane 38 between an opened position (solid outline in FIG. 1) and a locked position (dotted outline in FIG. 1).

Figure 4:
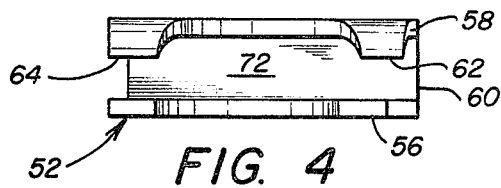
FIG. 4 is a view of the bracket shown in FIG. 3, taken along the lines and in the direction of arrows 4—4.
Figure 3:
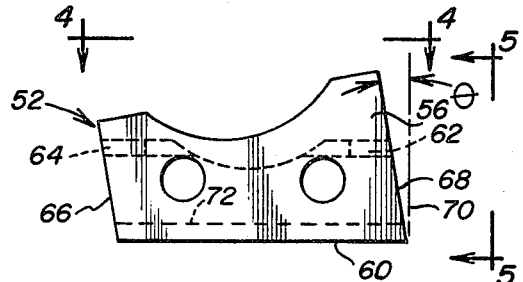
FIG. 3 is a bottom plan view of a bracket used in the latching assembly of the embodiment of the invention in FIG. 1.
Figure 5:
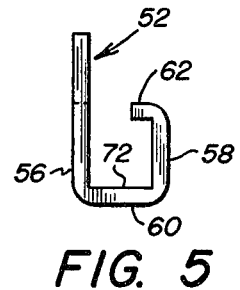
FIG. 5 is a view of the bracket shown in FIG. 3; taken along the lines and in the direction of arrows 5—5.

As best seen in FIGS. 3-5, bracket 52 has a generally U-shaped cross-section with parallel sidewalls 56 and 58, connecting wall 60, and lugs 62 and 64 extending from wall 58 to turn inwardly toward wall 56. Bracket 52 is constructed so that end surfaces 66 and 68 form an angle Theta with respect to a line 70 drawn perpendicular to surface 72 of connecting wall 60. Thus, when connecting bracket 52 to second sections 44 of intermediate portions 31 and 32, as by welding, surface 72 will extend at the angle Theta relative to a line 73 drawn perpendicular to lateral line 38 (See FIG. 1).

Figure 7:
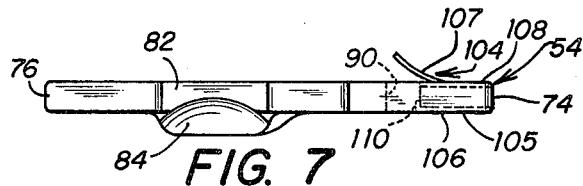
FIG. 7 is a view of the locking element shown in FIG. 6 taken along the lines and in a direction of arrows 7—7.
Figure 6:
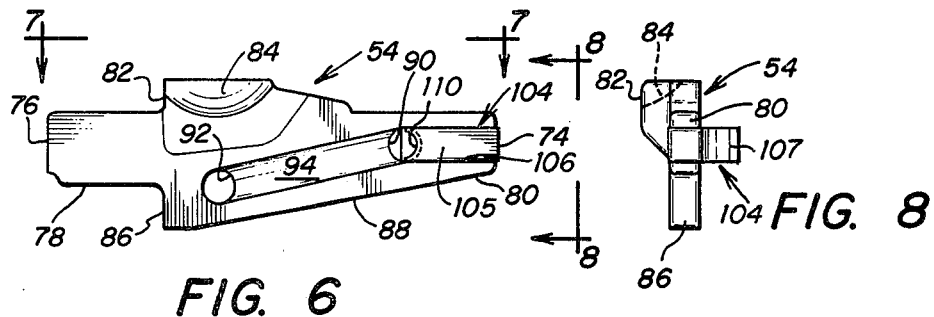
FIG. 6 is a top plan view of a locking element used in the latching assembly of the embodiment of the invention shown in FIG. 1.
Figure 8:
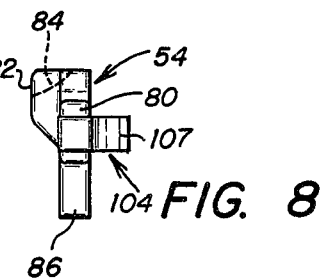
FIG. 8 is a view of the locking element shown in FIG. 6 taken along the lines and in the direction of arrows 8—8.

As best seen in FIGS. 6-8, locking element 54 includes a body 74 having a central section 76 which forms a first tang 78 on one end and a second tang 80 on the other end. A built-up shoulder, forming lip 82, extends outwardly of central portion 76 intermediate of the tangs and has a curved surface 84 extending into the built-up shoulder with a radius of curvature approximating that of ball 22 for engaging the ball when element 54 is moved to the locked position. It has been found that when surface 84 provides a surface area of approximately one square inch satisfactory matching occurs between ball 22 and element 54. A shoulder 86 extends outwardly from the side opposite of central portion 76 from the side of lip 82 so as to provide a surface 88 to cooperate with surface 72 on bracket 52. A first hole 90 is provided in second tang section 80 of central portion 76 to permit a locking device, such as a padlock, to be inserted therethrough when locking element 54 is moved to the locked position (See FIG. 1). A second hole 92 is provided in central section 76 of element 54 and is generally axially aligned with the curved surface 84. Further, a channel 94 extends into the central section 76 of element 54 between holes 90 and 92.

Figure 9:
FIG. 9 is a view of a spring used in the latching assembly of the embodiment of the invention shown in FIG. 1.
Figure 10:
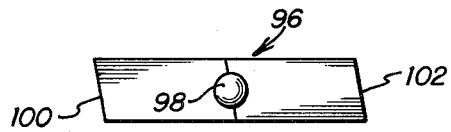
FIG. 10 is a view of the spring shown in FIG. 9 taken along the lines and in the direction of arrows 10—10.

As best seen in FIGS. 9-10 a leaf spring 96 may be disposed within bracket 52 to act between wall 58 and locking element or bar 54 to aid in preventing locking bar 54 from contacting the interior surface of wall 56. A knob 98 is provided on leaf spring 96 to engage second opening 92 to aid in preventing movement of locking element 54 when disposed in the locked position. To prevent spring 96 from movement within bracket 52, spring 96 is of substantially the same length as bracket 52 that requires that end surfaces 100 and 102 be tapered, which preferably is the angle Theta.

In operation, coupling device 20 is connected to the vehicle to be towed by bolts (not shown) extending through bolt holes 46 provided in leg portion 34 and 36. Locking element 54 is moved to the opened position (solid outline in FIG. 1), which has first tang 78 of locking element 54 extending outwardly of side 29 and with shoulder 86 in abutting arrangment with the interior of intermediate portion 31. Coupling device 20 is then positioned over and lowered onto ball 22 of ball-type hitch 24 which is connected to the towing vehicle (not shown). Locking element 54 is then moved to the locked position (dotted outline in FIG. 1) with second tang 80 extending by a distance sufficient for opening 90 to be disposed exteriorly of side 30 such that surface 84 is moved laterally into engagement with ball 22 through the co-action of cooperating surfaces 72 and 88. A padlock may be then used to insure the prevention of movement of locking element 54 transverse to lateral plane 38. However, when constructing latch assembly 50, the angle Theta is chosen to be sufficient to allow movement of bearing surface 84 away from ball 22 to disconnect the coupling device from the ball 22 while being less than that angle which causes movement of the locking element toward the opened position when the ball re-engages locking element 54 from the negative load condition (i.e., either ball 22 is moving downwardly away from device 20 or device 20 is moving upwardly away from ball 22 in FIG. 2). This angle Theta has been found to operate when selected to be between 10° and 20° and to operate extremely well when selected to be between 15° and 17°. It is also preferred that the bottom edge (as shown in FIG. 2) of surface 84 engages ball 22 at an angle of approximately 45° so that ball 22 is held in the closed or latched position through an angle of approximately 245°, i.e., the angle from the front edge of ball socket 40 through hemispherical surface 42 and bearing surface 84.

If desired a generally C-shaped leaf spring 104 may be attached to element or bar 54 to insure that the coupling device does not become accidentally disengaged with ball type hitch 24. One elongated side 105 of the leaf spring 104 is disposed in a channel 106 which extends from hole 90 to the outer edge of tang 74 in one side or bar 54, another elongated side 107 is partially disposed in a channel 108 which extends from the outer edge of tang 74 to hole 90 in an opposed side of bar 54, and a side 109 interconnecting sides 105 and 107 extends around the end of tang 74. A tab 110, provided on the outboard end of side 105, extends into hole 90 to connect leaf spring 104 to bar 54. Thus, when bar 54 is moved to the closed or locked position, the outboard end of side 107 moves away from the bar to engage section 44 of side 30 and prevent accidental or inadvertant movement of bar 54 to the opened or unloaded position.

The invention having been described, what is claimed is:

1. A coupling device for use on a towed vehicle, comprising: a strap-like body having a U-shaped front portion for receiving a ball of a ball-type hitch, and a side portion extending from each end of the U-shaped portion adapted to be connected to the towed vehicle; and a latch assembly for locking the ball in said body having a bracket connected to each side portion of said body, and a locking element supported by the bracket for movement between opened and closed positions, the movement being in a direction generally transverse to a lateral line which bisects the U-shaped portion, said locking element having a body with a bearing surface to engage the ball when in the closed position and with a surface moveably cooperating with a surface on said bracket, the cooperating surfaces being disposed at an angle relative to a line extending transversely to the lateral line, the angle being sufficient to allow the bearing surface to move away from the ball when the coupling device is in a negative load condition while being less than that angle which causes the locking element to move toward the opened position when the ball re-engages the locking element from the negative load condition.

2. A coupling device as called for in claim 1, wherein said latch assembly further includes a spring to urge the locking element into engagement with the bracket to insure engagement of the element with the bracket;

3. A coupling device as set forth in claim 1, wherein said strap-like body is symmetrically disposed about a lateral plane which intersects the lateral line.

4. A coupling device as set forth in claim 1, wherein the side portion of said strap-like body includes leg portions for connecting to the towed vehicle and, intermediate portions disposed between the U-shaped portion and the leg portions, the intermediate portions extending substantially parallel to the lateral plane bisecting the U-shaped portion, and the bracket being attached to the intermediate portions.

5. A coupling device as set forth in claim 4, wherein each leg portion includes an opening for receiving a bolt to connect the coupling device to the towed vehicle.

6. A coupling device as set forth in claim 1, wherein the angle is chosen to be between 10° and 20°.

7. A coupling device as set forth in claim 6, wherein the angle is chosen to be between 15° and 17°.

8. A coupling device as set forth in claim 1, wherein the body of the locking element includes a shoulder with the bearing surface formed therein.

9. A coupling device as set forth in claim 1, wherein the bearing surface in the body of the locking element includes a surface area of approximately one square inch.

10. A coupling device as set forth in claim 1, wherein the body of the locking element includes an opening which is disposed outwardly of the side portion when the locking element is in the closed position to permit the locking element to be fastened in the closed position.

11. A coupling device as set forth in claim 1, wherein said latch assembly further includes a spring to urge the locking element into engagement with the bracket, and the body of the locking element having a channel extending longitudinally thereof, the spring having a protuberance for entering said channel to retain the spring with in the latch assembly.

12. A coupling device as set forth in claim 1, including a ball socket connected to the U-shaped portion of said strap-like body for receiving the ball.

13. A coupling device as set forth in claim 12, wherein said ball socket includes a body with hemispherical ball engaging surface, the hemispherical surface having an axis of symmetry disposed in a lateral plane, which intersects the lateral line, the hermispherical surface axis having an upper portion that extends at an angle of approximately 20° relative to an axis of symmetry extending through the ball toward the front portion of said coupling device body.

14. A coupling device as set forth in claim 1, including spring means connected to an end of the locking element for preventing accidental movement of the locking element to the opened position after being moved to the closed position.

15. A coupling for use on a towed vehicle, comprising: a coupling body having a ball socket formed therein for receiving a ball on a towing vehicle; a surface on the coupling body; a locking element having a curved ball engaging surface and a bearing surface cooperating with said surface on the coupling body said locking element being moveable transversely of said coupling body for engagement with a lower portion of a ball positioned in said socket, said bearing surface on said locking element and said surface on said coupling body being inclined at an angle relative to the line extending transversely of the coupling body at an angle sufficient to assure that the component of force in a direction transversely of the coupling body which results from application of force in a direction longitudinally of the coupling body will not be sufficient to overcome friction between the bearing surface on the locking member and the surface on the coupling member to thus prevent movement of the locking member transversely of the coupling as a result of force applied to the locking member by the ball.

16. The coupling of claim 15, said coupling body including a bracket in said coupling body, said surface on the coupling body comprising a surface on said bracket.

* * * * *